United States Patent
Bosch

(10) Patent No.: US 9,997,912 B2
(45) Date of Patent: Jun. 12, 2018

(54) METHOD FOR CONTROLLING A TECHNICAL SYSTEM

(71) Applicant: SCHWEIZERISCHE BUNDESBAHNEN SBB, Bern (CH)

(72) Inventor: Julius Bosch, Olten (CH)

(73) Assignee: SCHWEIZERISCHE BUNDESBAHNEN SBB, Bern (CH)

(*) Notice: Subject to any disclaimer, the term of this patent is extended or adjusted under 35 U.S.C. 154(b) by 164 days.

(21) Appl. No.: 15/015,393

(22) Filed: Feb. 4, 2016

(65) Prior Publication Data

US 2016/0233676 A1  Aug. 11, 2016

(30) Foreign Application Priority Data

Feb. 10, 2015 (EP) .................................... 15154461
Dec. 2, 2015 (EP) .................................... 15197667

(51) Int. Cl.
*G05D 5/00* (2006.01)
*H02J 3/00* (2006.01)
(Continued)

(52) U.S. Cl.
CPC ................. *H02J 3/00* (2013.01); *B60M 3/00* (2013.01); *B61L 27/0027* (2013.01);
(Continued)

(58) Field of Classification Search
CPC ......... H02J 3/00; B60M 3/00; B61L 27/0027; B61L 27/0066
See application file for complete search history.

(56) References Cited

U.S. PATENT DOCUMENTS 9,646,264 B2 * 5/2017 Baughman ............ G06N 99/005
2014/0058572 A1 * 2/2014 Stein ...................... G06Q 50/06
700/291
(Continued)

FOREIGN PATENT DOCUMENTS

EP 2 505 416 A1 10/2012
EP 2 799 307 A1 11/2014
(Continued)

OTHER PUBLICATIONS

Bosch et al., "Potenziale für das Lastmanagement im Bahnenergiesystem," Bahnenergieversorgung, Issue 2, 2013, pp. 90-95.
(Continued)

*Primary Examiner* — Vincent Tran
(74) *Attorney, Agent, or Firm* — Oliff PLC

(57) ABSTRACT

Method for controlling a technical system including a power grid, connected to at least one energy supply system. The method ensures that the consumption of electrical energy of the grid is within a given load curve by avoiding or compensating peak loads; including the steps of: a) providing data of the total load occurring in the grid to a load data processor; b) the processor processing said data and determining curves of a plurality of load components of the total load; c) determining future load curves for each component for a time period ahead; d) superimposing the future load curves and determining a future total load curve for the future total load and future peak loads; and e) controlling the technical and/or energy supply systems based on the determined future total load curve to avoid exceeding given load limits and future peak loads or allocate energy required in the future.

21 Claims, 8 Drawing Sheets

(51) Int. Cl.
 *G05B 13/02* (2006.01)
 *B60M 3/00* (2006.01)
 *B61L 27/00* (2006.01)
 *H02J 3/14* (2006.01)
(52) U.S. Cl.
 CPC ........ *B61L 27/0066* (2013.01); *G05B 13/026* (2013.01); *H02J 3/14* (2013.01); Y02B 70/3225 (2013.01); Y04S 20/222 (2013.01)

(56) References Cited

U.S. PATENT DOCUMENTS

2014/0278692 A1* 9/2014 Marwah ........... G06Q 10/06312
 705/7.22
2014/0330460 A1* 11/2014 Schoonmaker ......... B61C 17/12
 701/19

FOREIGN PATENT DOCUMENTS

| JP | H05-16808 A | 1/1993 |
|---|---|---|
| JP | H08-34268 | 2/1996 |

OTHER PUBLICATIONS

Bosch et al., "Frequenzkomponenten des Bahstromlastgangs—Zusammenhänge mit dem Bahnbetrieb," Bahnenergieversorgung, Issue 4, 2014, pp. 180-186.

* cited by examiner

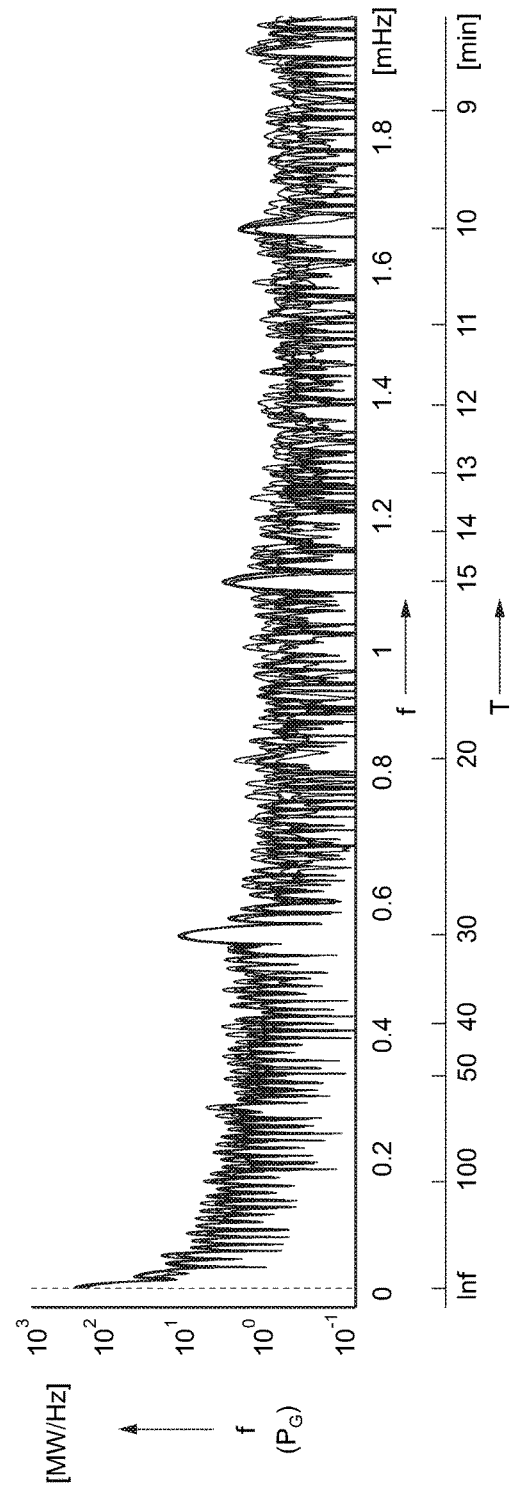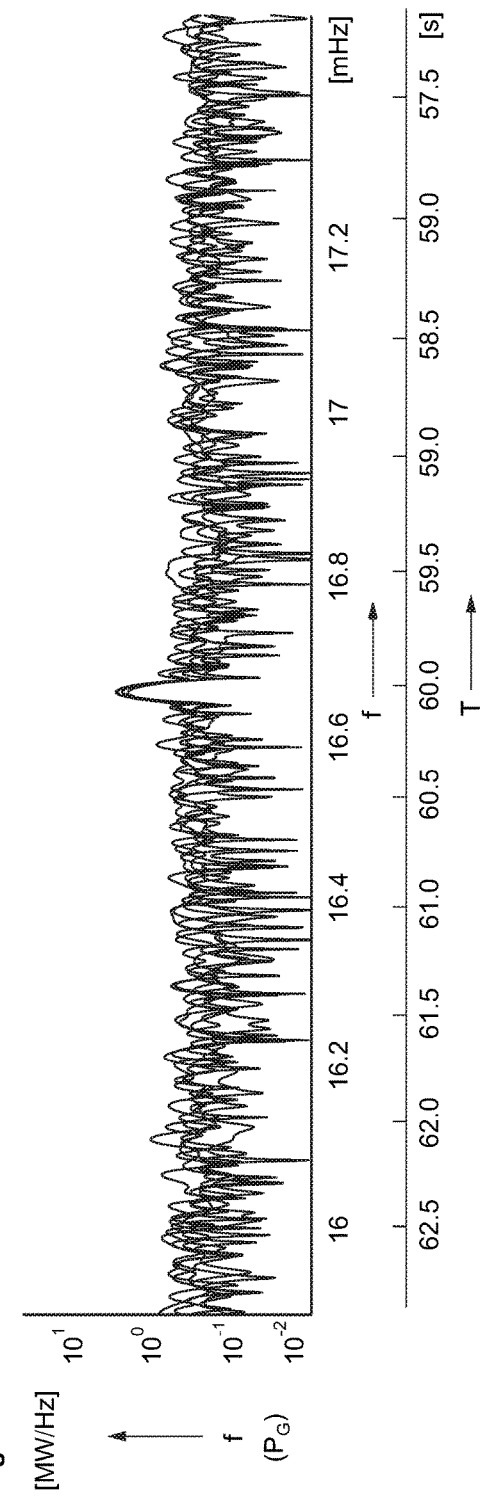

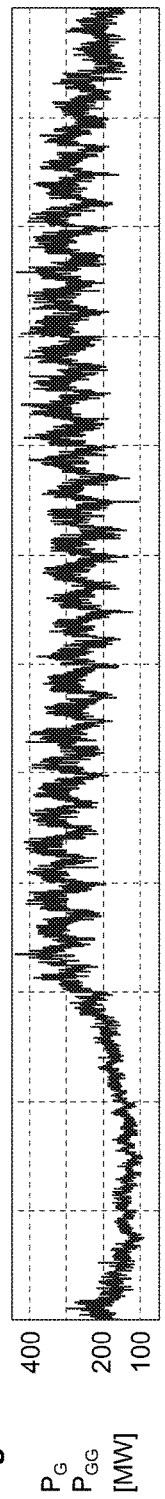
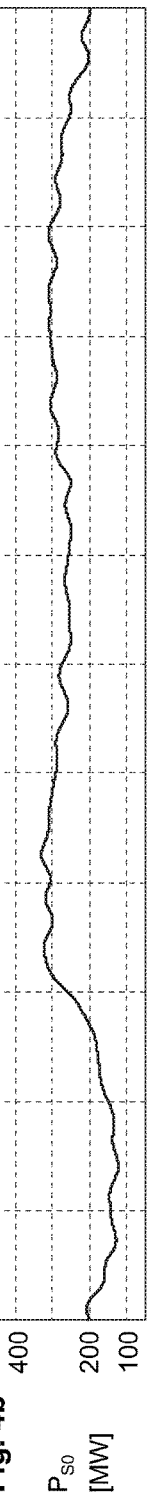
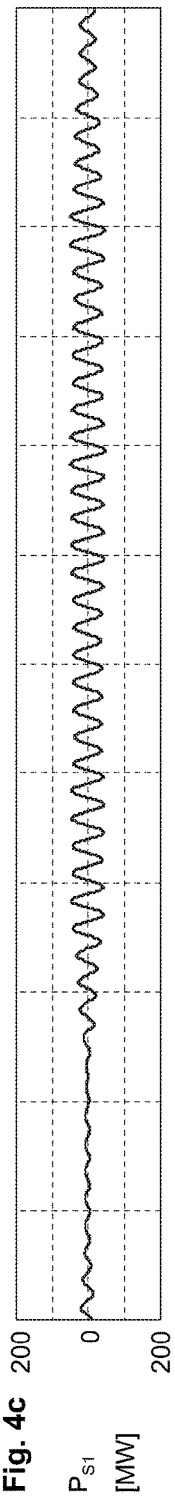
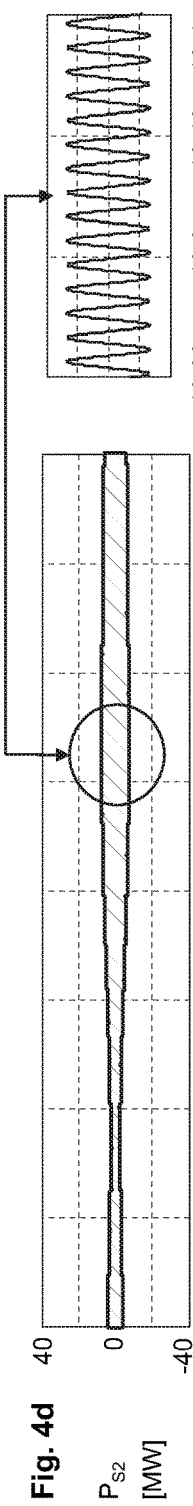
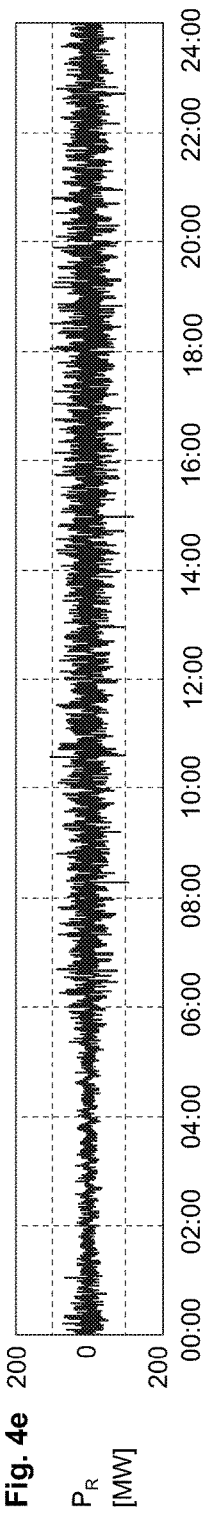
Fig. 4a $P_G$ $P_{GG}$ [MW]
Fig. 4b $P_{S0}$ [MW]
Fig. 4c $P_{S1}$ [MW]
Fig. 4d $P_{S2}$ [MW]
Fig. 4e $P_R$ [MW]

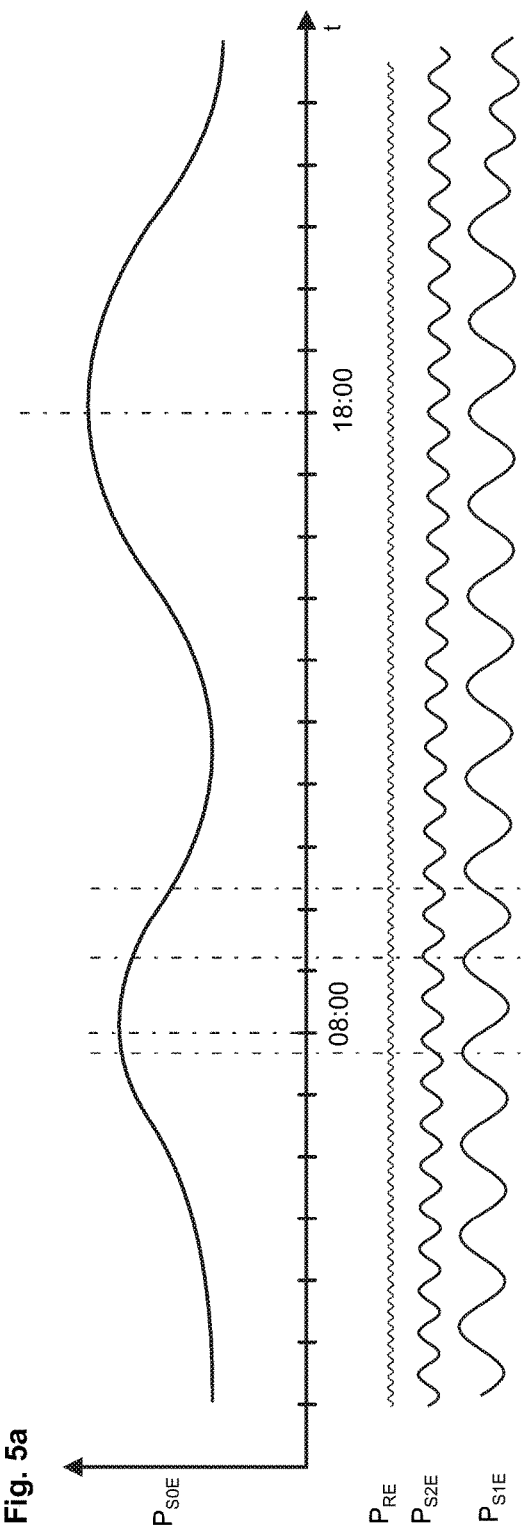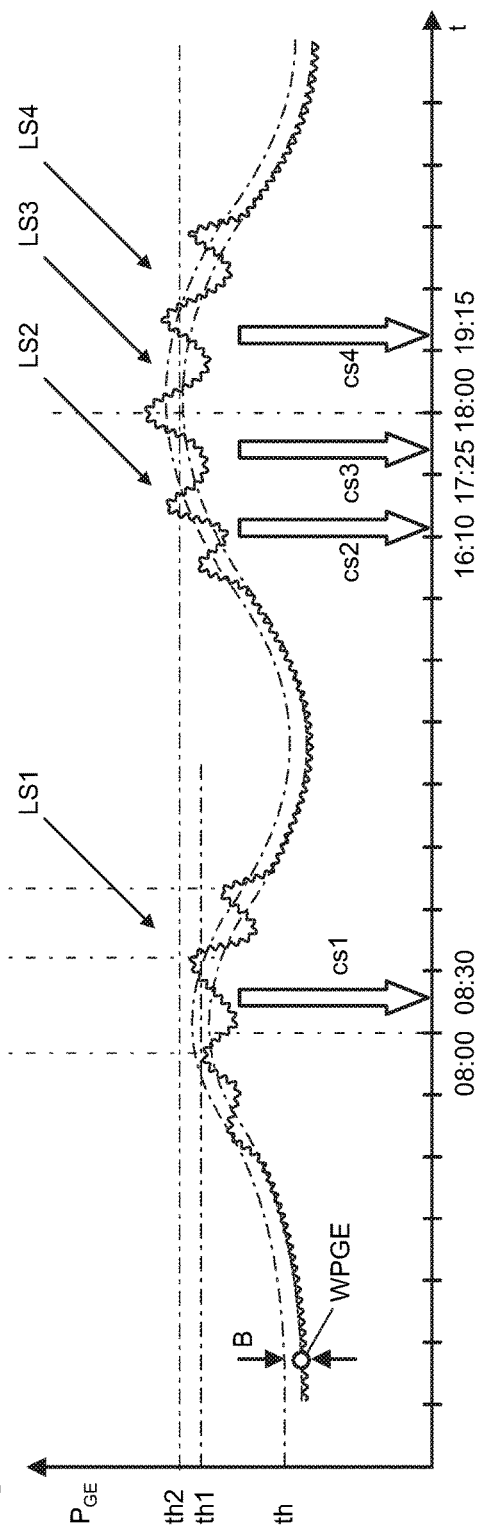

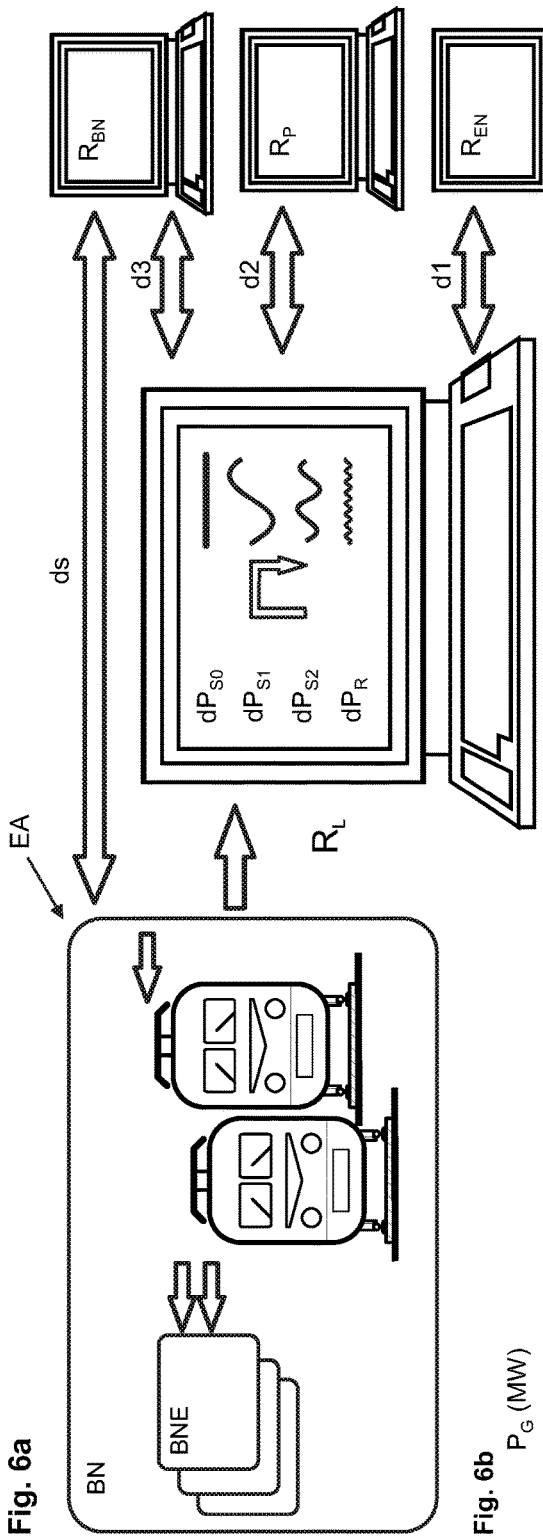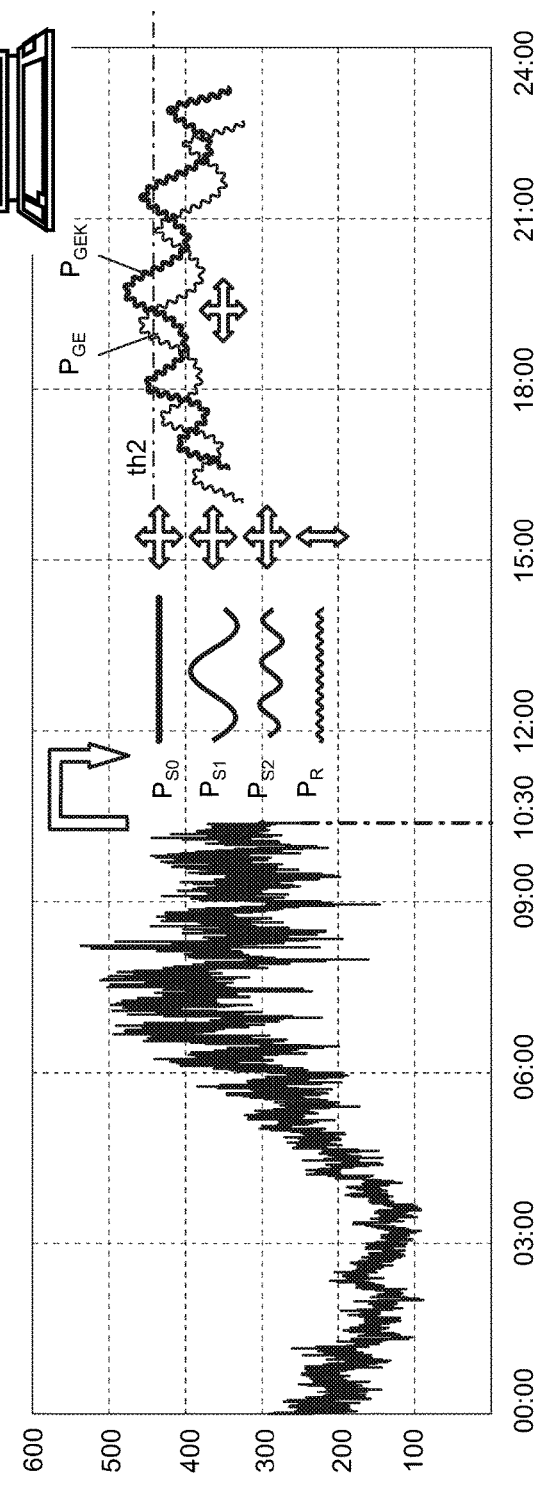

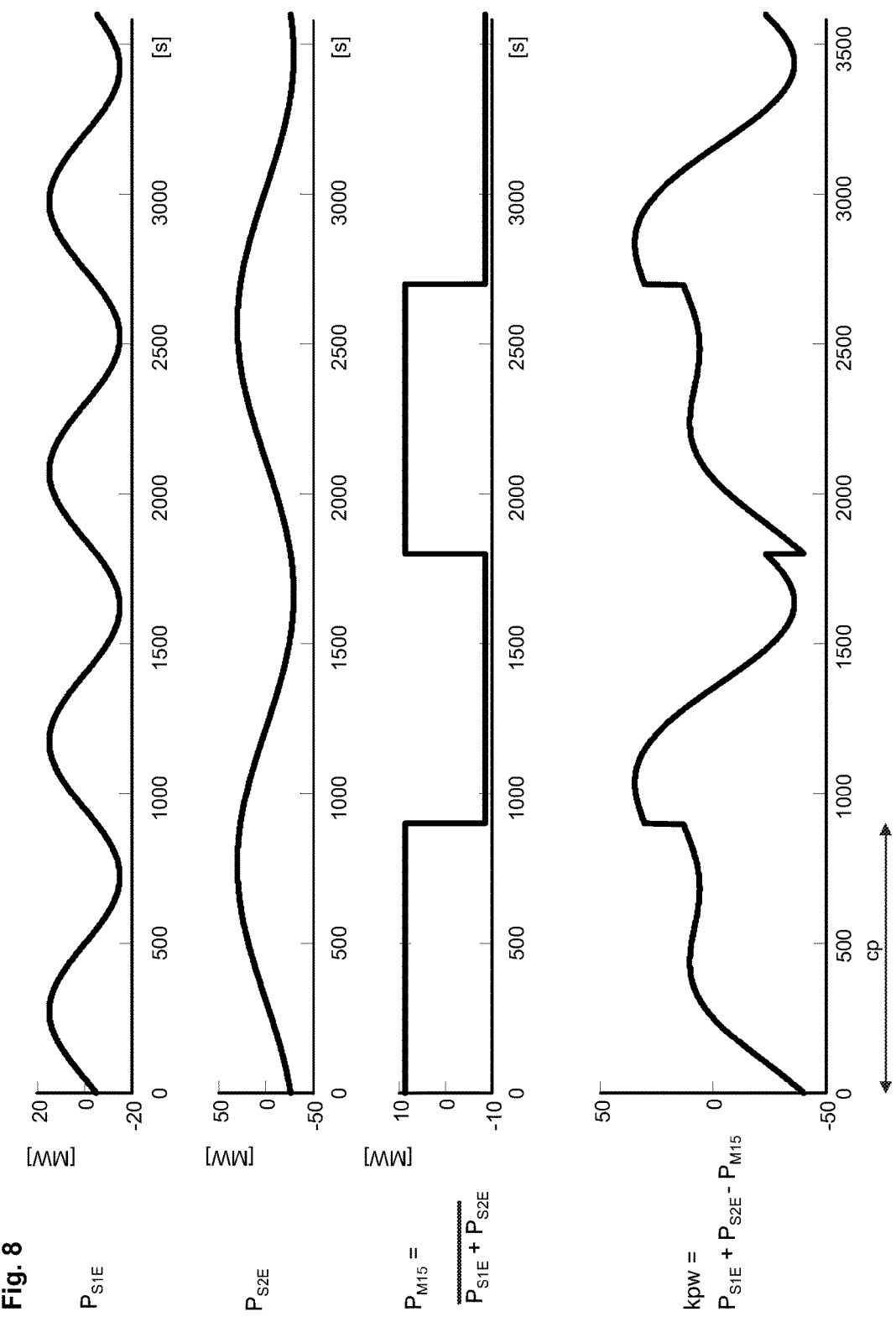

METHOD FOR CONTROLLING A TECHNICAL SYSTEM

The invention relates to a method for controlling a technical system such as a railway system, and/or an energy supply system connected to the technical system and to a technical system such as a railway system operating according to this method.

BACKGROUND OF THE INVENTION

In [1], J. Bosch, J. M. Aniceto, "Potenziale für das Lastmanagement im Bahnenergiesystem" (potentials for the load management in a railway energy system), eb—Elektrische Bahnen, issue 2, 2013, it is described, that the superposition of traction powers at specific points in time can cause considerable load fluctuations in the energy supply of railway systems. For covering such peak loads the required energy, which is defined by the maximum peak load and an energy reserve, must be allocated by power plants, often involving frequency transformation. Hence, a rise of peak loads in the future demands investments into the expansion of the energy supply system. Furthermore, energy for peak loads, which are provided by power plants that are designed for quickly meeting immediate energy demands, is costly, wherefore peak loads are normally avoided by load management.

[2], J. Bosch, Frequenzkomponenten des Bahnstromlastgangs—Zusammenhänge mit dem Bahnbetrieb (load oscillations of the rail current course—interdependencies with the railway operation), eb—Elektrische Bahnen, issue 4, 2014, shows a daily course of the total load in a power grid, namely the power grid of the Swiss Federal Railways, which exhibits peak loads in time ranges around 08:00 and 18:00. Further, frequencies of this load curve are shown, which are determined by a Fourier transform of the load curve. It is shown that due to the application of synchronised timetables significant load changes with a cycle duration of 1 minute and 30 minutes occur. Hence, peak loads occur particularly at times, at which the different periodic load changes simultaneously exhibit a maximum value.

In [1] it is describes that peak loads can be avoided by removing system units with lower priority from the power grid, so that peak loads are avoided while the operation of the railway system can be maintained. Load management can be controlled centrally or peripherally. With the peripheral control the power consumption is locally optimised for each system unit or train system, e.g. by reducing power supplied to the heating systems in times when the related train requires high traction power. With the central control, peak loads are centrally detected and control signals are sent out to switch peripheral system units. In this way, all participating system units can simultaneously be used for the load management. For the communication existing communication networks can be used and expanded. With the known load management systems, system units that are not essential, are typically deactivated e.g. between 7:00 and 9:00 or between 14:00 and 22:00, i.e. in times in which power consumption is high. Hence, system units or loads are typically removed from the power grid over longer time periods, in in which higher power consumption is expected.

However, deactivating loads, e.g. heating systems, over a longer period of time typically leads to a reduction in comfort for passengers and possibly causes functional restrictions in the railway system. Furthermore, it is possible that loads are deactivated unnecessarily, as it may turn out afterwards that power consumption has been less than expected. Furthermore, surprisingly, individual peak loads can sporadically occur outside the time ranges, in which loads are removed from the power grid. Hence, these peak loads, which can cause instabilities in the power grid of the technical system, are not taken into account by load management.

[3], EP2505416B1, discloses a method for allocating electrical energy for a railway system, with the steps of determining the trains in operation and their driving parameters; determining the load state in the power grid of the railway system; increasing the speed of at a train above a scheduled speed if the load state below an optimum load and reducing the speed of at least one rail vehicle for regenerative feed-in of electrical energy if the load state is above an optimum load.

This method is based on the measurement of the current load state and requires therefore short-term interventions into the railway system. The effects of the corrective measures, which are executed during an overload of the power grid, are insignificant. Furthermore, short-term interventions into the handling of travelling trains are rather undesirable.

[4], EP2799307A1, discloses a control device, with which a group of trains travelling in a railway system are controlled depending on train diagrams and a predetermined maximum power consumption such that the current power consumption lies below the maximum power consumption. For this purpose the control device establishes, based on train diagrams and train timetables resulting therefrom, a plan for the energy requirement and determines load values, which exceed the predetermined maximum power consumption.

This method requires significant efforts, since the loads need to be calculated for all occurring combinations of the individual loads of the vehicles for a complete day. For all changes of the timetables the calculations need to be repeated, whereby all these calculations are always based on assumptions, which often deviate from reality.

[5], JPH0516808, discloses a management system or a substation of the power grid of a railway system, which is assigned to a track section on which a plurality of trains can travel. The management system shall allow changing of timetables under the consideration of delays of individual trains, in order to avoid an overload of the power grid in this track section. In the event that individual trains are delayed, a significant increase in the train density in this track section can occur.

If trains with an earlier departure time are delayed and following trains travel are on time, then e.g. instead of three trains possibly seven to eight trains may travel in the same track section at the same time (see FIG. 8). In times, in which, due to train delays, higher train densities occur, the load on the substation increases, wherefore delays are determined by fuzzy logic and changes in the timetable are executed in accordance with the expected higher densities.

[6], JPH0834268A, proposes a method for the prediction of the load on a power grid of a railway system exploiting the fact that the power requirement of a train when travelling along the track section strongly depends on executed accelerations. Data of timetables and properties of individual train are handed over from a first unit, which calculates travel data, to a second unit, which calculates for the following time period the travel paths and the accelerations for each train. Based on accelerations calculated for the individual trains, a third unit determines the expected load on the power grid in a substation. Hence, with considerable efforts and based on determining travel data and the status and behaviour of the individual trains, future loads are calculated for a small section of the railway system.

Hence, prior art discloses solutions with which loads of section of the power grid of a railway system are determined by means of timetables and monitoring of the status and behaviour of the trains. For this purpose, with considerable effort, positions of the individual trains, possible delays with respect to a timetable as well as remaining distances and accelerations need to be determined with considerable efforts in order to be able to apply corrective measures in parts of the power grid.

SUMMARY OF THE INVENTION

The present invention is based on the object of providing an improved method for controlling a technical system, particularly a railway system, or for controlling an energy supply system connected to this technical system, as well as providing a corresponding technical system such as a railway system that is controlled according to the inventive method.

With the inventive method the technical system and/or the related energy supply system shall be controllable in such a way,
  A) that peak loads are avoided by selectively removing loads from the power grid or that peak loads are compensated by selectively allocating energy to the power grid in advance, and/or
  B) that the load on the energy supply system, at least for a specific period in time, does not exceed an agreed value.

Hence, the inventive technical system, which encloses or is connected to a power grid and comprises system units attached to the power grid, shall be operable in such a way that a smoothened load curve preferably without peak loads can be reached.

Further, the inventive technical system shall be operable in such a way that contractually agreed loads on the energy supply system are met by controlling the technical system or a locally available energy system, so that the operator of the technical system can cover his energy requirements at lowest cost by adhering to the contractual agreements.

Alternatively, the operator of the energy supply system shall be able to easily and precisely control the energy supply system and the energy supply systems connected thereto with an improved load prediction in order to timely allocate the required energy.

Interventions into the technical system, e.g. into the railway system and/or into the related energy supply system shall precisely be executable, so that unnecessary removals of loads, which impair the comfort of users and passengers, and the allocation of energy, which will not be required, can be avoided. However, sporadically occurring peak loads, which may appear at any point in time, shall be detectable, so that the stability of the power grid of the technical system and the stability of the energy supply system is always maintained.

The inventive method shall also allow convenient handling of unforeseen changes in the technical system or its processes, which are caused by external or internal influences and can cause unexpected peak loads.

The inventive method shall be executable automatically with little effort. Loads on the power grid of the technical system shall be predictable with a lead time and without time consuming evaluation of timetables and travel data of trains. Time-consuming revision of gathered data shall be avoided in the event that changes of travel schedules occur. The inventive method shall provide data of high quality for the load on the power grid required for a period ahead, e.g. a day or a week, so that in preferred embodiments the technical system and/or the energy supply system can precisely be controlled.

Furthermore, the data gathered according to the inventive method shall be a reliable source for additional improvements, which may be required.

These objects are reached with a method defined in claim 1 and a technical system, particularly a railway defined in claim 18. Preferred embodiments of the invention are defined in further claims.

The method serves for controlling a technical system such as a railway system that is connected to or comprises a power grid, which is connected to at least one energy supply system. The method ensures that the consumption of electrical energy in said power grid is kept within a given load curve by avoiding or compensating peak loads.

More particularly, the inventive method serves for monitoring, predicting and controlling the energy requirement of the technical system.

The method comprises the steps of
  a) providing data of the current course of the total load occurring in the power grid to a load data processor,
  b) the load data processor processing said data of the current course of the total load and determining curves of a plurality of load components of the total load,
  c) determining future load curves for each of the load components for a time period ahead;
  d) superimposing the future load curves and determining a future total load curve for the future total load and determining future peak loads; and
  e) controlling the technical system and/or the at least one energy supply system based on the determined future total load curve in order to avoid exceeding given load limits and to avoid future peak loads or to allocate energy required in the future, particularly energy required for compensating peak loads.

For controlling the technical system and/or the at least one energy supply system the predicted course of the total load is preferably compared with at least one threshold in order to detect future peak loads, which exceed the given threshold.

Avoiding detected future peak loads comprises the step of
  a) fully or partially deactivating or shifting the power consumption of individual units, i.e. loads in the technical system; and/or
  b) transforming kinetic energy present in the individual units of the technical system into electrical energy that is supplied to the power grid; and/or
  c) controlling the energy supply system in such a way that the energy required for compensating peak loads is allocated right ahead in time.

Hence, the inventive method is not based on the analysis of timetables and travel data or plans of production processes, but on loads which actually occur in the power grid of the technical system. These loads can automatically be determined and evaluated, wherefore the time-consuming task of collecting, updating and evaluating of timetables and travel data or plans of production processes is avoided. Hence, the inventive method has the advantages of precisely and automatically determining loads which are actually occurring in the power grid. Errors, which typically occur by the complex evaluation of timetables and travel data or plans of production processes, are avoided. The impact of internal influences, such as changes of timetables, or external influences can be considered with little effort.

The inventive method allows taking the required measures with a lead time right ahead before peak loads occur.

Hence, it is no longer required to deactivated loads over longer periods of time, in which high traffic volume typically occurs in the railway system.

Instead, time periods in which peak loads occur, can precisely be predicted and the required measures for avoiding peak loads and/or the allocation of the required energy can be tailored as needed and executed right in time. Unnecessary removals of loads are avoided, which always represent an undesirable intervention in an active system. The interventions into the technical system are reduced to a minimum thus also reducing impairment of functionalities and comfort to a minimum.

Deactivating heating systems in trains only for a short period of time will scarcely be noticed by train passengers. Precisely localising peak loads therefore allows fully or partially deactivating system units, such as heating systems in vehicles or buildings, which were not yet taken into consideration since a longer deactivation has not been tolerated by the technical system or its operator. Due to shorter interventions functional restrictions or disturbances can be avoided. Therefore with more precise interventions a higher number of system units of the technical system are available for load management purposes.

The inventive method further allows executing advantageous interventions into the technical system with which undesirable deactivations of system units are avoided. Instead based on the predicted courses of the load and the load components, the operation of selected system units is shifted in phase or time.

Thereby different measures can be taken for efficiently avoiding peak loads, so that interventions will not be noticed by the users of the technical system.

With a first measure periodic courses of two or more load components are mutually shifted such that a reduced or minimum load results in time ranges, for which peak loads were predicted. Hence, shifting the courses of the significant load components allows avoiding peak loads, without impairing system operation. In a railway system the departures of selected vehicles are shifted to an earlier or later point in time in order to avoid power intensive starts with high traction currents within the peak loads. Preferably, priorities are assigned to the trains. E.g., departures of freight trains are shifted for larger time intervals than departures of passenger trains.

According to a second measure, synchronised operation of the technical system, e.g. synchronised train departures, are abandoned at least partially in time periods, for which peak loads were predicted. For this purpose, system units corresponding to a periodic load component are operated with a time shift. E.g., starting times of selected trains, which normally depart every quarter of an hour, are started with a time shift of 1-2 minutes.

Priorities are preferably assigned to trains according to the available time reserves or occupation degree. Trains with a higher occupation degree get higher priority. Trains travelling a route with ample time reserve are operated with lower priority, since a delayed departure can be compensated before the next stop is reached. As a result, punctuality of the trains and stability of the schedules can be maintained.

The above described measures as well as measures for load reduction or load deactivation of system units are preferably mixed in such a way, that in the range of the peak loads always the required load reduction results.

System units are preferably stationary or mobile functional entities of the technical system, which are supplied with electrical energy. In a railway system, e.g. a heating in a switching point is a stationary system unit; while a locomotive is a mobile system unit. System units can also be sorted according to their function or importance for the technical system. System units that must be available without interruption are assigned to a first group. For the first group, which includes for example safety relevant system units such signal boxes, deactivation is generally excluded.

System units, which are required for the operation of the technical system, for which however a short deactivation is allowable, are assigned to a second group. E.g., locomotives can be deactivated for a short period of time such as 1-2 minutes. Furthermore, locomotives of passenger trains can be handled differently than locomotives of freight trains.

Heating systems, particularly heating systems of switching points, which can be deactivated for a longer period of time, e.g. 5 to 15 minutes belonged to a third group. System units which do not functionally interact with the processes of the technical system and primarily serve for the comfort of the user belong to a last group. Heating or lighting in a building or a train can fully or partially be deactivated without impairing the operation of the railway system.

For each technical system which is controlled with the inventive method, preferably all relevant system units or network entities are grouped in a list and provided with a priority level. The system units can be controlled by a local load data processor. The load data processor is preferably connected to a system controller which has access to the relevant system units. The load data processor reports peak loads to the system controller, which takes the required measures and deactivates system units or reduces their power consumption or operates the system units with a time shift.

The load data processor preferably communicates the height and duration of the peak loads to the system controller. The load data processor reports for example, that between 18:05 and 18:10 a peak load of 25 MW occurs. For this period of time the system controller then deactivates selected system units or limits their power consumption or shifts their operation in time so that between 18:05 and 18:10 a reduction of the power consumption of 25 MW is reached.

In order to precisely forecast the course of the total load for time period ahead, e.g. a day or a week, preferably all historical data that are relevant, e.g. data relating to inherent or surrounding conditions such as inner and outer influences and conditions, e.g. weather conditions and temperatures, are recorded.

By averaging load courses recorded over a plurality of days an averaged total course of the load can be determined, in which characteristic features of the daily load curve appear magnified and sporadic deviations are suppressed or reduced. Averaged load courses are preferably registered for individual each day of the week, for Monday, Tuesday, . . . , so that differences in operation, e.g. differences of the time schedules during the week days will not influence the predicted total course of the load. As well, the load courses for bank holidays are individually registered. Further, registered load courses are preferably grouped with respect to the surrounding conditions, so that load courses are available e.g. for different weather conditions or temperatures. An averaged load course, e.g. the load course registered for a Wednesday with snowfall and a temperature of −5° C., can therefore be taken as a reference for predicting the load course of the total load for a Wednesday with these conditions. More particularly load courses predicted according to the invention for such conditions can directly be applied.

In preferred embodiments data relating to external influences can also approximately be determined with a function so that instead of grouping load courses, a mathematical calculation can be taken for the prediction of the influence. When selecting a function or model, previously gathered knowledge is preferably applied.

For determining load components within the course of the total load that has preferably been averaged, the basic load as well as recursively or periodically occurring signal components are extracted and processed. The periodically occurring signal components are preferably extracted from the preferably averaged course of the total load by means of a Fourier transform.

The course of the basic load is the floating average of the total load, which is formed by smoothening time- and data series, e.g. by removing signal components with higher frequency. The floating average results for example by the application of a low pass filter having a finite impulse response (FIR-Filter).

Periodic processes are of paramount importance, if the operations are clocked in the technical system. In a railway system, which operates on a regular timetable, the trains depart clocked every n minutes (for example 15, 30 or 60 minutes). Since trains simultaneously depart high loads periodically occur.

Preferably, the height of the noise level of the load course, i.e. the load noise is also determined, which is caused by randomly switching system units of the technical system on and off. The load noise can have a significant impact on the total load and the peak loads and can therefore also lead to instabilities in the electricity network of the technical system.

Preferably, data of internal influences on the course of the total load, such as status data of the technical system, error messages, schedule data and schedule changes are evaluated and corresponding load changes are evaluated and taken into account in the determination of the future course of the total load. In the event that malfunctions and disturbances occur in the technical system typically numerous loads are deactivated and trains may be put out of operation. After the removal of the malfunction the system units are activated again and the trains are put again into operation, wherefore for a short period of time a high total load is to be expected. Also schedule changes lead to changes in the load curve.

In a further preferred embodiment data of external influences on the course of the total load are evaluated and corresponding load changes are calculated and taken into account when predicting the future course of the total load. Climatic conditions have a significant impact on the load on the power grid of a railway system. At temperatures below freezing point heaters are used. By means of weather stations with temperature sensors weather conditions and temperatures are measured. Based on measured data system units are switched on or off by local systems or are remote-controlled by higher level control systems.

Weather conditions or disorders in the technical system can cause phase shifts in the periodic load components. In case of snow or technical malfunctions in the railway system train departures may be delayed, whereby deviations from the timetable clock and thus also from predicted course of the total load can occur. Hence, in a preferred embodiment, the load data processor therefore always monitors the current course of the total load in order to determine the current courses or curves of the load components, which are compared with the previously determined future courses the load components. If deviations are found, the previously determined curves of the load Components are corrected and then superimposed onto one another to determine a corrected future course of the total load. In this way it is possible to adapt the forecast of the course of the total load to internal and external influences.

This shows a significant advantage of the inventive method. While in systems of the prior art, the amendment of an established plan would require extensive rework, with the inventive method load components that have changed and their impact on the future load can easily identified and corrections can be applied.

Preferably, the height of the noise component of the current load curve is also determined and the future course of the total load is adjusted accordingly, if the load noise as a significantly changed.

When correcting the predicted future course of the total load the applied thresholds may also be readjusted so that peak loads can precisely be detected.

Peak loads are always undesirably, independent of the current load on the power network or power grid. If the total load is at a low level for several hours, e.g. at the half of the maximum load, providing energy reserves for such peak loads even at this power level still involves efforts and costs. Hence, in preferred embodiments, for two or more different ranges of the future course of the total load individually selected thresholds are provided, with which future peak loads can be detected at any level of the total load.

In a further preferred embodiment a variable or adaptive threshold or threshold curve is applied, which is preferably adapted to the course of the basic load and offset therefrom by a selected threshold value. This adapted threshold curve allows detecting all deviations from the basic load. Thereby it is possible, to detect and compensate periodic and aperiodic deviations from the basic load. Hence, the adaptive threshold not only allows compensating peak loads but also a normal waviness of the load. The course of the total load can be smoothened, whereby the technical system and the energy supply system are further stabilised. The inventive load management applied to the technical system further leads to a reduced load on the energy supply system, which on a higher level is also confronted with peak loads. The energy supply system is typically connected with numerous technical systems, such as public transportation systems, particularly railway systems, or private companies, which run production processes that consume high volumes of electrical energy, such as metal factories in which numerous electrical systems operate. If these technical systems are controlled with the inventive method, then the waviness of the energy requirement or consumption can significantly be reduced.

For the predicted peak loads, which exceed a given threshold, control signals are generated with a lead time that allows reducing or shifting the power consumption of system units of the technical system before the peak loads occur. Alternatively, the energy supply system is controlled such that the electrical energy required for the peak loads is allocated with a lead time.

For executing the inventive processes the load data processor is provided with a software program with which the technical system is monitored and controlled.

Further, the load data processor is connected via data channels with a system controller, with which the selected system units of the technical system are controllable. The system controller preferably forwards data to the load data processor, containing information about experienced loads and measured internal and external influences which have an impact on the load curve. Further, the system controller preferably monitors the status of the deactivated system units, which are activated again when required.

Knowledge of future load courses not only allows load management within the technical system but also improved control such as closed-loop control of one or more energy supply systems and energy sources.

The inventive method allows an operator of a technical system, e.g. of a railway system, to cover the basic load, i.e. the expected energy requirement, from a first energy supply system and to control the technical system or a second energy supply system such that the energy taken from the first energy supply system does not overshoot or undershoot the expected value. By timely deactivating loads costly deviations, which occur when a given limit is exceeded, can be avoided. Instead, by timely controlling the second energy supply system the required energy can be delivered by the second energy supply system right in time, with which an additional energy requirement can be covered that lies beyond the basic load.

The load data processor is preferably also connected to an energy data processor, with which the at least one first and/or second energy supply systems are controllable. The energy data processor is informed that due to peak loads a higher energy requirement has occurred. Further, the duration and the height of the additional energy requirement are communicated. The energy data processor can report back, that the additional energy can be allocated or cannot be allocated so that system controller can instead timely deactivate loads, reduce power consumption, and/or shift operating processes.

In a preferred embodiment, one or more predicted courses of load components are superimposed for one or a plurality of control periods. From the sum signal the direct component is removed and a second control signal is formed, which is used to control the at least one first and/or second energy supply system. The second first energy supply system is preferably part of the control path of a control loop, and is controlled in such a way that deviations of the energy consumption from the basic load are compensated by the second energy supply system.

The control loop is provided preferably with a guide value that corresponds to the basic load. The second control signal is superimposed on the guide value to form a corrected guide value, which is compared with a measurement value that is derived from the technical system and that corresponds to the current load, i.e. the current energy consumption. With the second control signal and the measurement value a difference signal or control deviation is formed, which is forwarded to a loop controller, which calculates an actuating variable that is provided to the controlled energy supply system.

In a preferred embodiment, the load data processor is further connected via data channels to a planning data processor, which delivers operating data, particularly timetable data for the future operation of the technical system. For changes in the timetables the load data processor will adapt the predicted load courses.

The load data processor, the software program implemented in the load data processor and the collected data are continuously updated to ensure optimum performance.

BRIEF DESCRIPTION OF THE DRAWINGS

Below the invention is described in detail with reference to the drawings. Thereby show:

FIG. 3a load oscillations resulting from the Fourier transform of the averaged course of the total load PGG with the indication of the amplitude, the frequencies and the cycle duration for frequencies of up to 2 mHz;

FIG. 3b load oscillations resulting from the Fourier transform with the indication of the amplitude, the frequencies and the cycle duration for frequencies of above 2 mHz;

FIG. 4a the course of a total load PG or the averaged course of a total load PGG for 24 hours;

FIG. 4b the course of the basic load PS0 over 24 hours extracted from the course of the total load PG, PGG of FIG. 4a after removing periodic signal components and noise components;

FIG. 4c the course of a first load component PS1 over 24 hours extracted from the course of the total load PG, PGG of FIG. 4a, which exhibits a cycle duration of 30 minutes;

FIG. 4d the envelope of a second load component PS2 over 24 hours extracted from the course of the total load PG, PGG of FIG. 4a, which exhibits the cycle duration 1 minute, and a detailed view of this load oscillation PS2 in the time domain between 10:00 am and 10:15 am;

FIG. 4e the course of the load noise for 24 hours extracted from the course of the total load PG, PGG of FIG. 4a;

FIG. 5a a forecast of the course of the basic load PS0E predicted over 24 hours without the predicted higher load oscillations PS1E, PS2E and the load noise PRE that are shown separately;

FIG. 5b the superposition of the predicted course of the basic load PS0E and the predicted higher load oscillations PS1E, PS2E and the predicted load noise PRE of FIG. 5a, forming the predicted course of the total load PGE;

FIG. 6a symbolically a power grid BN of a railway system EA, from which load data are transferred to a load data processor RL, which exchanges data with a system controller RBN, a planning data processor RP and an energy data processor REN;

FIG. 6b the actual course of the total load PG of the power grid BN of the railway system EA up to 10:30 a.m., that is analysed to determine the current signal phases and/or amplitudes or values of the basic load PS0 according to FIG. 4b, the load components PS1, PS2 according to FIG. 4c and FIG. 4d as well as the amplitude of the load noise PR according to FIG. 4e, in order to initiate corrective measures;

FIG. 8 courses of the predicted load components PS1E, PS2E of FIG. 5a, which exhibit cycle durations of 15 and 30 minutes, the average value PM15 of the sum of these load components PS1E, PS2E for a cycle duration of 15 minutes as well as correction signal kpw that is formed by subtracting the average value PM15 from the sum of the load components PS1E, PS2E and that is supplied to the control loop EAR shown in FIG. 7.

DETAILED DESCRIPTION OF THE PREFERRED EMBODIMENTS

Figure 1:
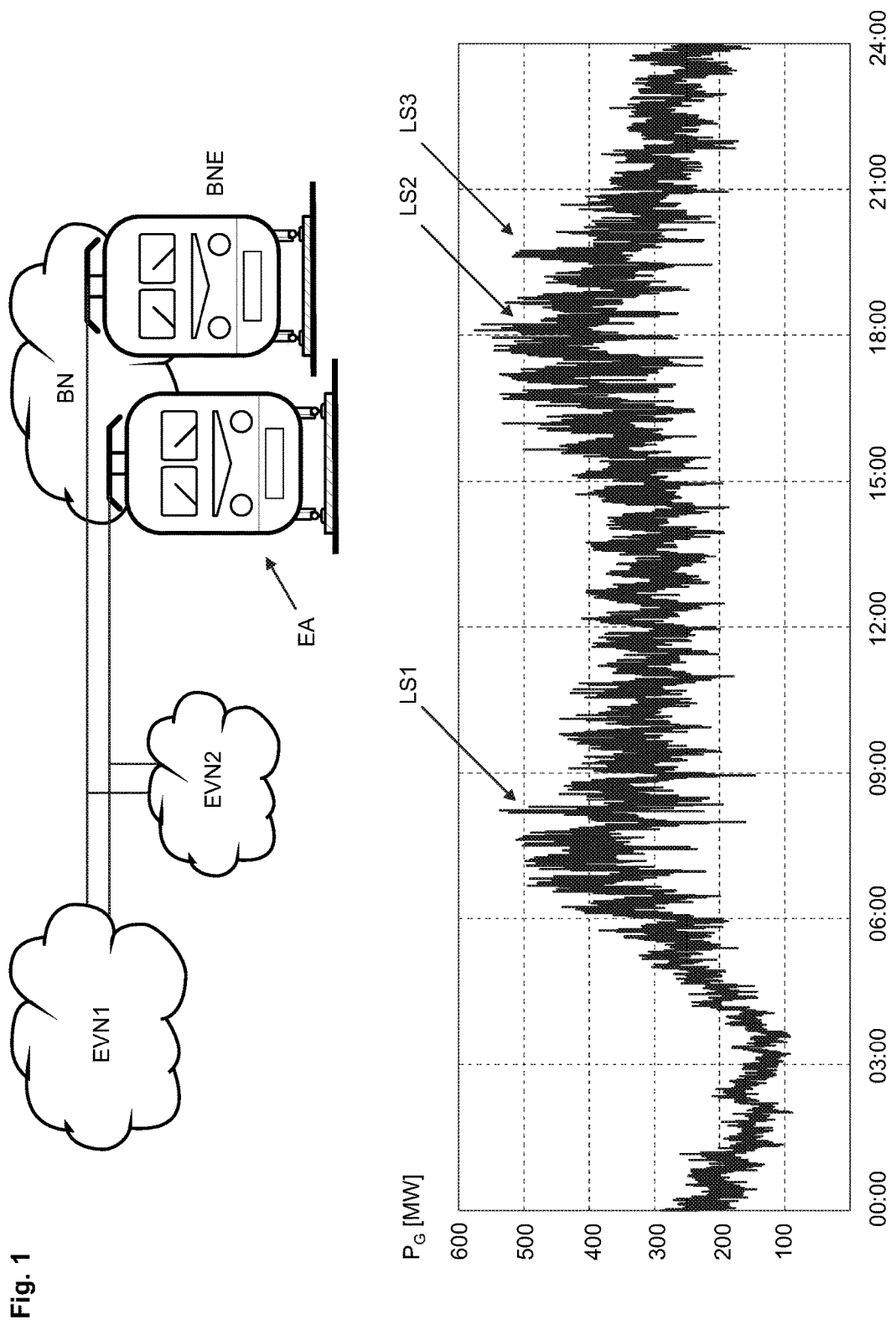
FIG. 1 a course of a total load PG in a power grid BN of a technical system EA, particularly a railway system, over 24 hours exhibiting higher loads and peak loads in in the time ranges around 08:00 and 18:00.

FIG. 1 shows in as an example a load curve of a total load PG recorded in a technical system EA, namely in a power grid BN of a railway system EA over 24 hours. The railway system EA is shown with two trains or system units BNE that act as loads in the power grid BN. The power grid BN of the railway system EA is supplied with electrical energy by a first energy supply system EVN1 and a second energy supply system EVN2.

The diagram shows that in the time ranges around 08:00 and 18:00 the traffic volume rises and higher loads are applied to the power grid BN of the railway system EA. Around 08:00, loads of up to 500 MW and around 18:00, loads of up to 550 MW are registered. In between, the loads are reduced to a level below 400 MW. In this example it is shown that the peak loads LS1, approx. at 08:15, LS2, approx. at 18:10, and LS3, approx. at 20:00, are most significant. With peak load LS1, the load or the power consumption rises by approx. 66% from approx. 300 MW to approx. 500 MW within a short period of time. In known load management systems, loads had been deactivated for longer periods of time. Further, it is important to note that peak loads can sporadically occur also outside the typical ranges of increased power consumption. Hence, if load management systems would only consider the maximum energy requirement around 08:00 and 18:00 in the load curve, then the sporadic but intense peak load LS3 at 20:00 would be neglected.

It should further be noted that the average load in the time range around 18:00 is higher than the average load around 8:00. Therefore, for handling said peak loads LS1; LS2 in these time ranges, preferably different measures are applied.

According to the inventive method, for avoiding or compensating peak loads a load data processor RL (see FIG. 6a) is used that is equipped with a software program dedicated to performing the inventive load management. The load data processor RL receives, e.g. from the system controller RB of the technical system EA or the power grid BN of the railway system EA or from an energy data processor REN of the energy supply system (see FIG. 6a) data relating to the actual course of the total load PG measured in the technical system EA or in the power grid BN. Further, the load data processor RL can also process data of reported partial loads, e.g. loads of network segments, which are summed up for determining the total load PG.

Figure 2:
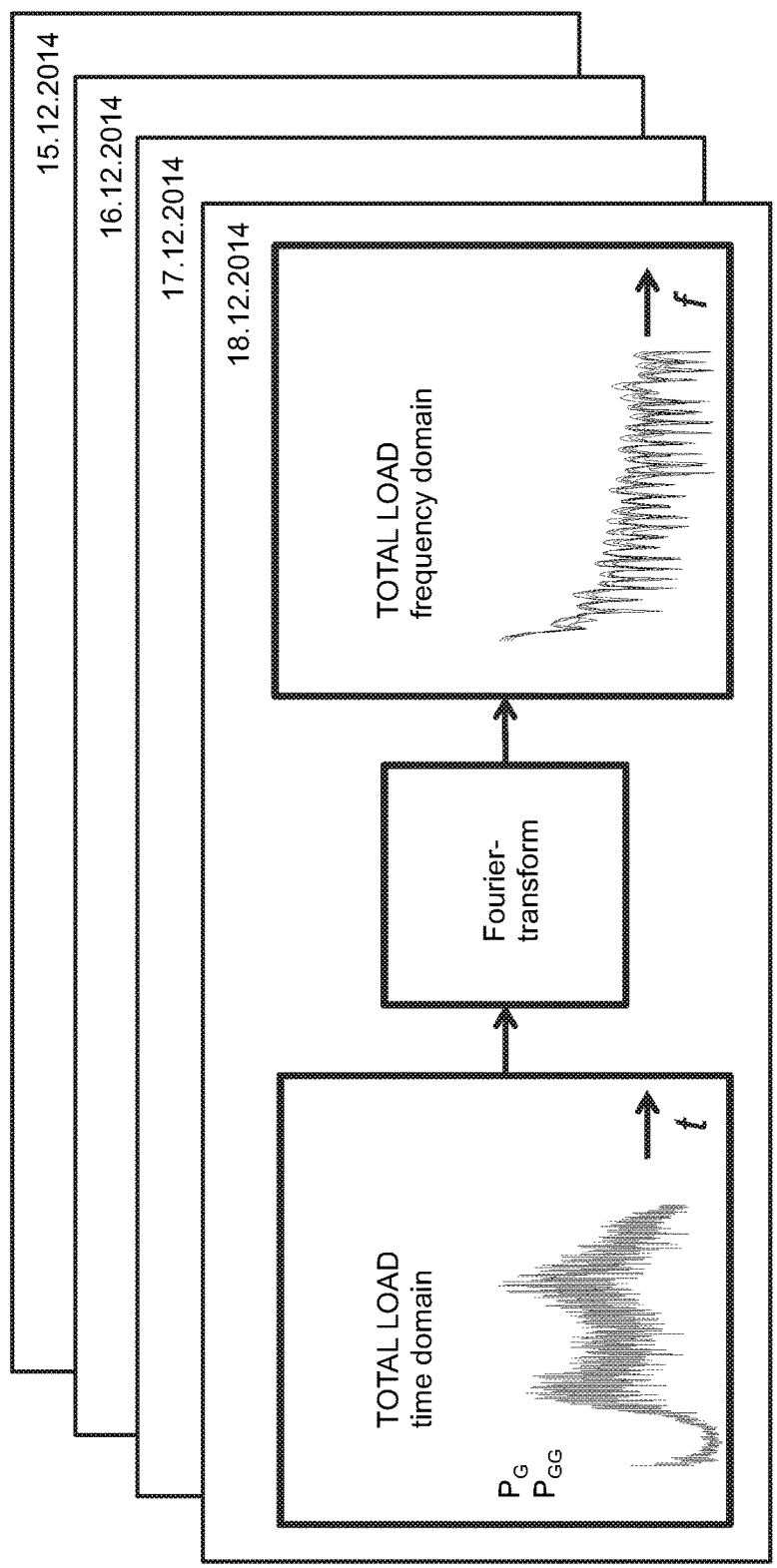
FIG. 2 the superposition PGG of the courses of the total load PG, PGG in the power grid BN of the railway system EA that were recorded for several days in the time domain and the averaged course of the total load PGG after a Fourier transform in the frequency domain.

FIG. 2 shows that load courses that were recorded over a plurality of days (in the given example from 15 Dec. 2014 to 18 Dec. 2014) had been summed up and averaged, in order to differentiate characteristic features of the load curve from random occurrences. For a single day a single course of the total load PG is recorded. For courses of the total load PG which had been recorded for a plurality of days an averaged course of the total load PGG is calculated, which allows a more precise forecast of future load courses.

From the course of the total load PG or from the averaged course of the total load PGG, individual courses of load components PS0, PS1, PS2 are determined (see FIGS. 4b, 4c and 4d), which significantly contribute to peak loads that appear in the technical system EA.

A course of a basic load is preferably also determined, which corresponds to the floating average of the course of the total load PG or the averaged course of the total load PGG. The course of the basic load is determined by smoothening of time- and data series or by removing signal components with higher frequency. The load data processor RL preferably comprises a signal processor, in which a filter, preferably a FIR-filter is implemented, which serves for filtering the preferably averaged course of the total load PG, PGG.

For determining periodic load components PS1, PS2 in the preferably averaged course of the total load PG, PGG preferably a Fourier transform is applied. Alternatively, band-pass filters are applied with which periodic load components PS1, PS2 can individually be detected.

The left side of FIG. 2 shows the course of the total load PG, PGG in the time domain. The right side of FIG. 2 shows the course of the total load PG, PGG in the frequency domain.

FIG. 3a shows load oscillations or load components resulting from the Fourier transform with the indication of the amplitude, the frequency and the cycle duration for frequencies up to 2 mHz.

FIG. 3b shows load oscillations or load components resulting from the Fourier transform with the indication of the amplitude, the frequency and the cycle duration for frequencies above 2 mHz.

On the abscissa of the diagram the frequency and the cycle duration of the load oscillations are entered (in FIG. 3a in minutes and in FIG. 3b in seconds). On the ordinate the amplitude of the load oscillations is indicated in megawatts. It is shown that in the range of the basic load a power consumption of several 100 MW occurs. Further, load oscillations with high amplitude and cycle durations of 1 minute, 10 minutes, 15 minutes and 30 minutes occur. For facilitating the description, in a simplified example below only load oscillations with cycle durations of 1 minute and 30 minutes are considered. These load oscillations are caused by the synchronised timetable or by the operation cycles with which the trains travel in the railway system EA.

FIG. 4a shows the preferably averaged course of the total load PG, PGG over 24 hours, which corresponds for example to the course of the total load PG, PGG of FIG. 1 or FIG. 2.

FIG. 4b shows the course of the basic load PS0 over 24 hours, which has been extracted from the course of the total load PG, PGG of FIG. 4a by subtracting signal components with higher frequency such as frequencies above 10 mHz. As mentioned, the course of the basic load PS0 is gained by filtering or averaging the course of the total load PG, PGG. This course is known as Moving Average.

FIG. 4c shows the course of a first load component PS1 over 24 hours extracted from the course of the total load PG, PGG of FIG. 4a, which exhibits a cycle duration of 30 minutes. It can be seen that after 05:30 a rise of the amplitude of this $1^{st}$ load component or load oscillation PS1 occurs that reaches a value of about 50 MW.

FIG. 4d shows the envelope of a second load component PS2 over 24 hours extracted from the course of the total load PG, PGG of FIG. 4a, which exhibits the cycle duration 1 minute, and a detailed view of this load oscillation PS2 in the time domain between 10:00 and 10:15. This load component PS2 reaches amplitudes slightly above 10 MW.

FIG. 4e shows the course of the load noise for 24 hours extracted from the course of the total load PG, PGG of FIG. 4a. It can be seen that the load noise can reach high power levels and is preferably also taken into account for load management purposes.

After determining the different load components PS0, PS1, PS2, the future courses PS0E, PS1E, PS2E are determined for each of these load components PS0, PS1, PS2. It may be assumed that the future courses of the load oscillations remain unchanged, if the conditions do not change and the processes in the technical system EA are not altered. If no changes occur, then the predicted load oscillations PS0E, PS1E, PS2E will exactly correspond to the extracted load components PS0, PS1, PS2.

FIG. 5a shows schematically the course of the basic load PS0E which has been predicted or forecast for the next day.

Further shown are the courses PS1E, PS2E and PRE which have been predicted for the next day for the first two load components PS1, PS2 and the load noise PR.

FIG. 5b shows schematically the superposition of the predicted course of the basic load PS0E and the predicted higher load oscillations PS1E, PS2E and the predicted load noise PRE of FIG. 5a, forming the predicted course of the total load PGE.

When forecasting the course of the total load PGE, internal and/or external influences acting on the technical system EA are preferably taken into account. This can be done in several ways. On the one hand, courses of the total load PG, which have been recorded earlier under similar internal and/or external influences or conditions, can be considered when forecasting the course of the total load PGE. Alternatively, for internal and/or external influences deviations from the predicted course of the total load PGE can continuously be evaluated and taken into account when calculating or estimating the future course of the total load PGE.

At lower temperatures, heating systems are normally started in the technical system EA, which leads to a high load on the energy supply system. If from one day to the other a temperature drop is forecast, then load courses can be used for predicting the course of the total load PGE, which were recorded at a day with the predicted temperatures. Alternatively, the course of the total load PGE can be evaluated and then be modified depending on the internal and/or external influences, e.g. by adding an offset.

Likewise, information can be collected for occurring incidents. For each incident the impact on the load on the technical system EA is examined. Preferably, the incidents are divided into classes, to which load parameters are assigned, which are considered in the forecast of the course of the total load PGE.

Hence, the method allows automatic learning for generating knowledge based on experience, which is applied for future forecasts of the course of the total load PGE or PS0E. The collected knowledge and the current and/or predicted influence parameters or values can advantageously be processed by a neural network in order to optimally predict the course of the total load PGE or PS0E.

The course of the total load PGE predicted for the next day allows detecting peak loads based on reference values or thresholds th, th1, th2. Thereby, fixed thresholds th1, th2 and/or variable thresholds th can be used. Fixed thresholds th1, th2 can be applied depending on the time of the day. In the present example the lower first threshold th1 is applied between 00:00 and 12:00 and the higher second threshold th2 is applied between 12:00 and 24:00. With the first threshold th1 a first peak load LS1 is detected approx. at 08:30 and with the second threshold th2 further peak loads LS2, LS3 and LS4 are detected between 17:00 and 19:00.

For the detected the peak loads LS1, . . . , LS4 control signal cs1, . . . , cs4 are generated with a predetermined lead time. With the control signals cs1, . . . , cs4 selected loads or system units of the technical system EA are deactivated or the energy data processor REN of the energy supply system EN is controlled such that the energy required for the peak loads LS1, . . . , LS4 is timely allocated.

Preferably a variable or adaptive threshold th is applied, which is selected depending on
a) the time of the day, and/or
b) the predicted course of the total load PGE, and/or
c) the energy prices EP, and/or
d) the available energy reserves, and/or
e) the predicted value WPGE of the total load PGE at this point in time.

Most favourable is the selection of a variable threshold that is based on the predicted course of the basic load PS0E, to which an offset is added. The offset is preferably selected such that a bandwidth B results, within the predicted low noise PRE will occur.

$$th = WPGE + B$$

The offset or the bandwidth B can be a product of a plurality of factors.

$$B = k * 1/EP * 1/WPGE$$

For higher energy costs and higher values for the predicted total load PGE preferably a smaller bandwidth B is selected.

By using a variable or adaptive threshold th, peak loads LS1, . . . , LS4 can easily, precisely and completely be detected.

The lead time with which a crossing of the thresholds th, th1, th2 or the occurrence of peak loads LS1, . . . , LS4 is reported in advance by the load data processor RL, is selected such that the required measures, a load control action such as deactivation of system units or the allocation of energy, can be done right ahead in time. A larger lead time is preferably selected for peak loads with higher amplitude and longer duration.

Corrective measures are preferably selected depending on the nature of the peak loads LS1, . . . , LS4. For peak loads with a shorter duration, measures are taken which do not interfere with the operating processes executed in the technical system EA, e.g. deactivation of heating systems. Interventions into the operating processes will take place preferably only for peak loads with an unexpected high amplitude and duration.

FIG. 6a shows a power grid BN, for which load data are measured and forwarded to a load data processor RL, which exchanges data with a system controller RBN, a planning data processor RP and an energy data processor REN. The load data processor RL may receive load data from the system controller RBN or from the energy data processor REN.

FIG. 6b shows the current course of the total load of the power grid BN of the railway system EA up to 10:30 a.m., that is analysed to determine the current signal phases and/or amplitudes or values of the basic load PS0 according to FIG. 4b, the load components PS1, PS2 according to FIG. 4c and FIG. 4d as well as the amplitude or power of the load noise PR according to FIG. 4e, in order to initiate corrective measures. Shifts of the clock cycle, changes of the amplitudes of individual load components PS0, PS1, PS2 and changes of the amplitude of the load noise PR, are preferably registered as early as possible, so that the predicted course of the total load PGE can be corrected and a corrected course of the total load PGEK can be established. Since peak loads may significantly change when the load components PS1, PS2 are shifted, recording of changes allows further improving the inventive load management procedures.

Load control for reducing or avoiding predicted peak loads is executed centrally or peripherally. The load data processor RL communicates the amplitude and duration or the complete curve of the peak loads to the system controller RBN, whereafter the system controller RBN determines stationary or mobile system units BNE which will be controlled according to the invention. Stationary or mobile system units BNE are preferably designed such that they can be operated in a plurality of operation modes, in which different power consumption is present. In this case, the system controller RBN can forward a desired mode of operation to a peripheral controller, e.g. a train controller, whereafter the train controller switches the controlled system units BNE accordingly.

The inventive method, which serves for monitoring and controlling the power grid BN of a technical system EA has been described with reference to a railway system EA. However, technical systems can comprise different devices, in which electrical loads, particularly electrical engines, are operated. The inventive method can be applied in production sites or facilities, in which high loads periodically appear or in which processes are periodically executed.

Figure 7:
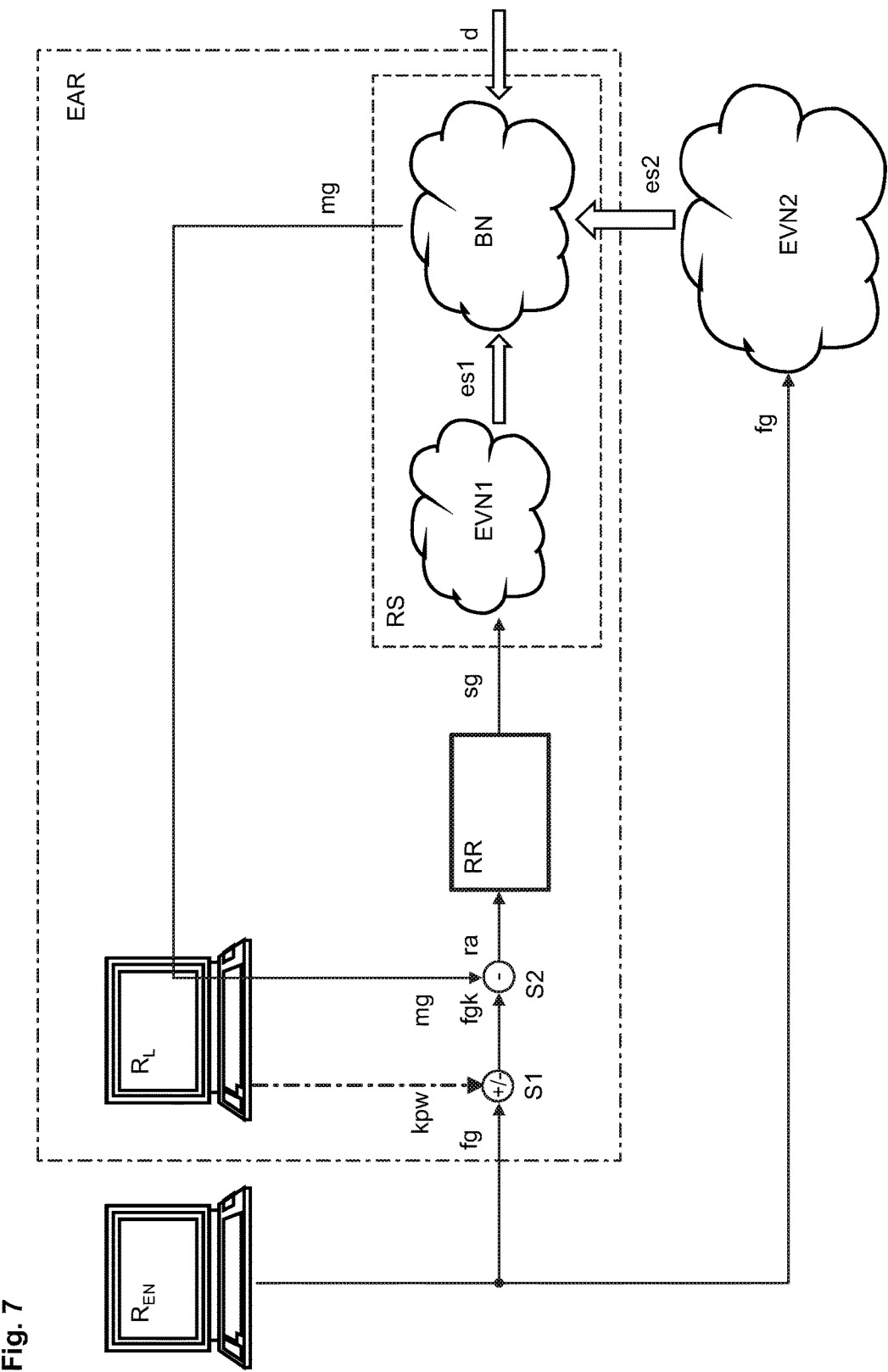
FIG. 7 an external energy supply system EVN2 and a control loop EAR with which an internal energy supply system EVN1 is controlled.

FIG. 7 shows an external energy supply system EVN2 and a control loop EAR with which a local or internal energy supply system EVN1 is controlled, which supplies a first part es1 of the energy required the technical system EA. The external energy supply system EVN2, which delivers a second part es2 of the energy required by the technical system EA, is controlled by the energy data processor REN such that the basic energy requirement of the technical system EA is covered. The first energy part es1 and the second energy part es2 cover the total energy requirement of the technical system EA. The control loop EAR controls the internal energy supply system EVN1 such that the second energy part es2 delivered by the external energy supply system EVN2 does not overshoot and possibly undershoot a predetermined value. Ideally the second energy part es2 remains constant at the lowest possible level.

The operator of the technical system EA and the operator of the external energy supply system EVN2 may for example close a contract for the delivery of the second energy part es2, which may correspond to the basic or average energy requirement of the technical system EA. In order to avoid deviations from the agreed maximum energy consumption from the external energy supply system EVN2, i.e. the defined second energy part es2, the internal energy supply system EVN1 is controlled accordingly to cover additional energy requirements. If deviations from the basic load or the second energy part es2 occur, which may be caused by events that are represented in FIG. 7 as disturbance variable d, then an additional energy requirement shall not be covered by costly energy delivered from the external energy supply system EVN2, i.e. by increasing the second energy part es2, but with lower-priced energy delivered from the internal energy supply system EVN1, i.e. by increasing the first energy part es1. E.g., a weather change may cause a change of the disturbance value d requiring activation of heating systems in the technical system EA. The energy required by heating systems, which would exceed the value of the second energy part es2 is then covered by increasing the first energy part es1 by controlling the internal energy system EVN1 accordingly.

For controlling the technical system EA in this way, as shown in FIG. 7, a guide value fg, which corresponds to the value of the second energy part es2 and preferably to the basic load, is delivered to the control loop EAR and is compared with a measurement value mg, which corresponds to the current energy requirement of the technical system EA that is measured and/or calculated. The difference between the guide value fg and the measurement value mg is used as control deviation ra, which is forwarded to a controller RR that provides an actuating variable sg to the internal energy supply system EVN1. With the actuating variable sg the output of the internal energy supply system EVN1 is controlled in such a way that an additional energy requirement is covered by an increase of the first energy part es1.

Due to the waviness of the energy requirements large load deviations may cause large deviations of the actuating variable sg in the control loop EAR, which are undesirable, since said waviness may not be fully absorbed by controlling the internal energy supply system EVN1. The remaining waviness of the load is applied to the external energy supply system EVN2 and may cause a violation of the contract and penalties.

In order to further reduce the waviness, a correction signal kpw, which corresponds to the waviness of the load of the technical system EA, is evaluated and added to the guide value fg. Changes in the waviness of the load are therefore predictable and can be immediately be compensated by controlling the internal energy supply system EVN1 with a lead time. Hence, the internal energy supply system EVN1 accurately follows the waviness of the predicted load curves, e.g. the course of the total load PGE. Hence, the waviness of the load of the technical system EA is fully compensated by the internal energy system EVN1, wherefore the waviness of the load of the technical system EA has none or little influence on the second energy part es2 delivered by the external energy system EVN2. The described disturbances, which influence the technical system EA, are compensated by the control loop EAR as described.

FIG. 7 shows that the correction signal kpw is subtracted from the guide value fg, so that a change of the load or energy requirement according to the waviness represented by the correction signal kpw leads to an immediate change of the actuating variable sg. The correction signal kpw can be applied with a lead time so that the internal energy system EVN1 delivers the energy without delay. In such a way, the correction signal kpw, which corresponds to the waviness, forms an anticipatory control deviation, which influences the actuating variable sg foresighted, in order to achieve a desirable control of the internal energy supply system EVN1.

The correction signal kpw or waviness of the load of the technical system EA can be derived from one or more significant load components PS0, PS1, PS2. In a preferred embodiment the predicted load curve of at least one load component is taken or the predicted load curves of a plurality of load components PS1, PS2 are summed up for one or a plurality of control periods cp and the direct component or offset is removed in order to build the correction signal kpw.

With the second control signal kpw, which does not comprise a DC-offset, the waviness information of the load of the technical system EA is applied to the first energy supply system EVN1, which is controlled accordingly and which is part of the control path RS the control loop EAR shown in FIG. 7.

FIG. 8 shows courses of the predicted load components PS1E, PS2E of FIG. 5a, which exhibit cycle durations of 15 and 30 minutes and the average value PM15 of the sum of these load components PS1E, PS2E established for control durations or control periods cp of 15 minutes. By summing up the load oscillations PS1, PS2 and subtracting the average value PM15 for every control period cp, the above described correction signal kpw is formed, which is applied to the control loop EAR of FIG. 7 and predicts the expected control deviation that is caused by the waviness of the load with a lead time.

REFERENCES

[1] J. Bosch, J. M. Aniceto, Potenziale für das Lastmanagement im Bahnenergiesystem (potentials for the load management in a railway energy system), eb—Elektrische Bahnen, issue 2, 2013

[2] J. Bosch, Frequenzkomponenten des Bahnstromlastgangs—Zusammenhänge mit dem Bahnbetrieb (load oscillations of the rail current consumption—interdependencies with the railway operation), eb—Elektrische Bahnen, issue 4, 2014,
[3] EP2505416A1
[4] EP2799307A1
[5] JPH0516808
[6] JPH0834268A

The invention claimed is:

1. A method for controlling a technical system that includes a power grid which is connected to at least one energy supply system, in such a way that the consumption of electrical energy in said power grid is kept within a given load curve by avoiding or compensating peak loads, the method comprising the steps of:
    providing data of the course of the total load occurring in the power grid to a load data processor;
    the load data processor processing said data of the course of the total load and determining curves of a plurality of load components of the total load, including processing data of the course of the total load for a single day or a plurality of days and determining a total load curve, and the load components being determined by:
        extracting recursively occurring signal components from the total load curve, and/or
        extracting periodically occurring signal components from the total load curve, and/or
        extracting the noise component from the total load curve;
    determining future load curves for each of the load components for a time period ahead, the future total load curve being determined based on the determined total load curve;
    superimposing the future load curves and determining a future total load curve for the future total load and determining future peak loads; and
    controlling the technical system and/or the at least one energy supply system based on the determined future total load curve in order to avoid exceeding a given load limit, to avoid future peak loads or to allocate energy required for compensating predicted peak loads.

2. The method according to claim 1, further comprising the steps of:
    determining the load components by the application of a Fourier transform to the total load curve.

3. The method according to claim 1, further comprising the steps of:
    extracting a curve of a basic load component from the curve of the total load.

4. The method according to claim 1, further comprising the steps of:
    extracting periodically occurring signal components from the curve of the total load, which signal components correspond to operating cycles of a timetable, with which the technical system is operated.

5. The method according to claim 1, further comprising the steps of:
    analysing data that relate to internal influences on the curve of the total load;
    evaluating related load changes; and
    correcting the future total load curve based on the evaluated load changes.

6. The method according to claim 1, further comprising the steps of:
    analysing data that relate to external influences on the total load;
    evaluating related load changes; and
    correcting the future total load curve based on the evaluated load changes.

7. The method according to claim 1, further comprising the steps of:
    determining changes in the amplitude or phase of the curves of the determined load components and correcting the future load curves accordingly.

8. The method according to claim 1, comprising the steps of:
    comparing the future total load curve with at least one fixed or variable threshold in order to determine future peak loads that exceed the selected threshold.

9. The method according to claim 8, further comprising the steps of:
    providing a threshold for one or a plurality of ranges of the future total load curve, said threshold being based on the curve of the fundamental load component including an offset.

10. The method according to claim 8, further comprising the steps of:
    generating first control signals with a lead time ahead of the future peak loads, which exceed the related threshold; and
    controlling individual units of the technical system or the at least one energy supply system with these first control signals in such a way that said future peak loads are avoided or the required energy is allocated for the future peak loads.

11. The method according to claim 10, further comprising the steps of:
    controlling individual units of the technical system by
    fully or partially deactivating or shifting the power consumption of individual units of the technical system; or
    transforming kinetic energy present in the individual units of the technical system into electrical energy that is supplied to the power grid.

12. The method according to claim 1, further comprising the steps of:
    creating a second control signal by
        selecting a predicted load curve of at least one of the load components;
        evaluating a direct component in the selected load curve for at least one control period;
        removing the direct component from the selected load curve for each control period; and
        controlling the at least one energy supply system with the second control signal.

13. The method according to claim 12, comprising the steps of:
    creating a second control signal by
        creating a sum signal by adding predicted load curves of at least two of the load components;
        evaluating a direct component in the sum signal for at least one control period;
        removing the direct component from the sum signal for each control period; and
        controlling the at least one energy supply system with the second control signal.

14. The method according to claim 12, further comprising the steps of:
    controlling with the second control signal the first energy supply system, which is part of a control path of a control loop, with which load deviations from a basic load are covered, which basic load is supplied by the second energy supply system.

15. The method according to claim 14, further comprising the steps of:

providing a guide value, which corresponds to the basic load, to the control loop;

superimposing the das second control signal onto the guide value, in order to obtain a corrected guide value;

deriving a measurement value from the technical system, which value corresponds to the actual energy consumption;

comparing the corrected guide value with said measurement value; and determining a corresponding control deviation that is forwarded to a controller, which provides an actuating variable to the controlled first energy supply system.

16. A technical system comprising:

a power grid, which is connected to at least one energy supply system, the power grid including a load data processor and a software program installed in the load data processor, with which the technical system is controlled with the method according to claim 1.

17. The technical system according to claim 16, wherein the load data processor is connected via data channels to a system controller, with which the system units of the technical system are controlled.

18. The technical system according to claim 16, wherein the load data processor is connected via data channels to a system controller, with which at least one of the energy supply system can be controlled.

19. The technical system according to claim 16, wherein the load data processor is connected via data channels to a planning data processor, from which data can be downloaded.

20. The technical system according to claim 16, wherein the technical system is a railway system.

21. The method according to claim 1, wherein the technical system is a railway system.

* * * * *